May 13, 1952 W. G. WELLINGTON 2,596,516
PISTON CONSTRUCTION
Filed July 8, 1948

Inventor
WELTON G. WELLINGTON
By C. G. Stratton
Attorney

Patented May 13, 1952

2,596,516

UNITED STATES PATENT OFFICE 2,596,516

PISTON CONSTRUCTION

Welton G. Wellington, Pomona, Calif., assignor to Falcon Products, Inc., Pomona, Calif., a corporation of California Application July 8, 1948, Serial No. 37,695

2 Claims. (Cl. 309—23)

This invention relates to pistons more particularly adapted for use in well casings, mud pumps, etc. In such use and in other analogous uses the abrasive action of grit and sand causes rapid deterioration of the piston parts and more particularly the non-metallic parts thereof. Under conditions of high pressure, the non-metallic packings—usually synthetic rubber— lose their initial shape and tend to flow and thereby become pinched between the casing in which the piston operates and such metallic member or members that mount the packings. In double-acting pistons, such as disclosed herein, one packing seeks to flow and is pinched during one direction of the piston stroke, and the other similarly affected during the opposite stroke.

An object of the present invention, therefore, is to provide a piston having opposed elastic packing seals that are designed to efficiently seal against the walls of a casing or cylinder in which the piston operates, and to provide means preventing flow of the material of said seals, while under pressure, and thereby obviate their becoming pinched between the casing or cylinder wall and the metal member mounting said seals.

Another object of the invention is to provide a double-acting piston that embodies a central metallic plate and in which the opposite packings of said piston are integrally connected through openings formed in said plate for more effective bonding of the packings to said plate.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
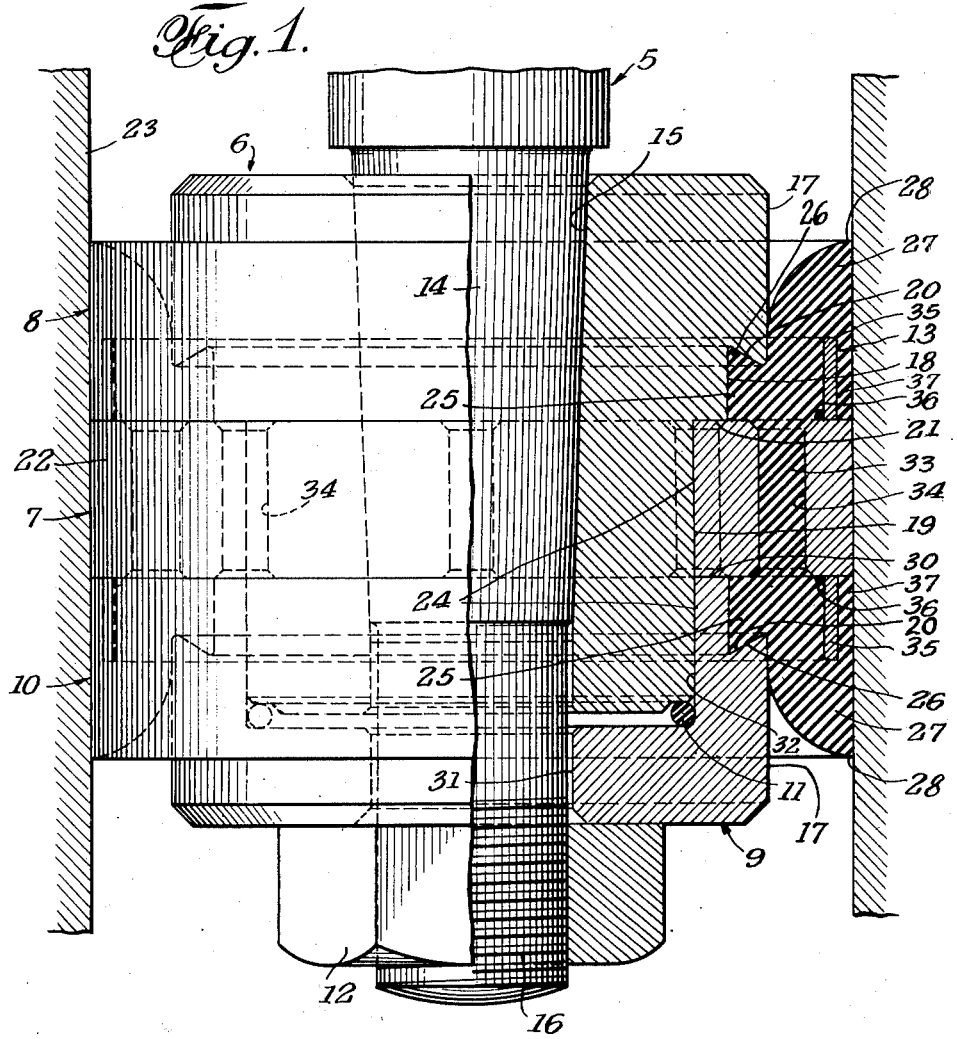
Fig. 1 is an elevational view, in quarter section, of a piston constructed according to the present invention.

The piston which is illustrated in the drawing comprises, generally, a piston rod 5, a head 6 mounted on the rod, a metallic packing spacer plate 7 mounted on the head, a packing member 8 clamped between the head and the spacer plate, a metallic follower 9 telescopically engaged with the head, a second opposed packing member 10 clamped between the follower and the head, a sealing ring 11 for sealing between the follower and the head, a nut 12 threadedly engaged on rod 5 and locking, in assembly, the elements of the piston, and means 13 extending from each side of spacer plate 7 and embedded in packing members 8 and 10 for stabilizing said members to prevent flow thereof under pressure.

The piston rod is provided with a tapered shank 14 to fit a tapered seat 15 formed centrally in head 6, and with a reduced threaded end 16 for the nut 12.

The head 6 comprises a tubular metallic member that has an outer cylindrical face 17 at the end toward the piston rod, an intermediate cylindrical face 18, and a relatively smaller cylindrical face 19 on the opposite end. Where faces 17 and 18 join there is formed an inwardly angled annular shoulder 20 in such a manner that faces 17 and 18 overlap to form an undercut annulus. A flat transverse annular shoulder 21 is formed where faces 18 and 19 meet.

The spacer plate 7 comprises a ring having an outer cylindrical face 22 designed for a free sliding fit in a cylinder or casing 23 in which the piston reciprocates, and an inner bore 24 for a slip fit over the cylindrical face 19 of the head. The spacer plate 7 fits endwise against shoulder 21 of said head.

Figure 2:
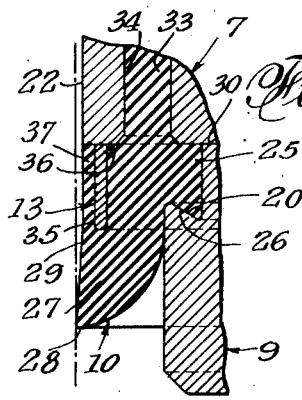
Fig. 2 is a fragmentary sectional view showing the packing when not confined in a casing or cylinder.

The packing member 8 is formed as a ring of suitably elastic material such as natural or synthetic rubber, and is provided with an inner, annular base flange 25 designed to fit the face 18 between shoulder 20 and spacer plate 7. Said flange is formed with an angled face 26 that fits shoulder 20 in the undercut formed thereby. The main body 27 of the packing ring extends outwardly and laterally of flange 25, said extension being reducingly tapered to form a relatively thin annular terminating edge 28. In practice, as seen in Fig. 2, the peripheral face 29 of said packing ring is conical rather than cylindrical, being smaller adjacent spacer plate 7 and flaring outwardly to a diameter at edge 28 that is larger than that of the spacer plate and of the bore of the casing or cylinder 23. It will be evident then that the packing ring, particularly at its free edge 28, is inwardly compressed and seeks intimate sealing engagement with said bore.

The follower 9 is formed as a ring having an outer cylindrical face 17, an inner cylindrical face 18, and an angled shoulder 20 therebetween that are counterparts of similarly numbered portions of head 6. The end 30 of said follower engages the opposite face of spacer plate 7 from that engaged by shoulder 21. The relationship is such that the packing ring 10 is identical to ring 8, is mounted with its edge 28 opposite to edge 28 of ring 8 and bears reference numbers similar to said ring. The follower 9 is provided with a central bore 31 for the threaded end 16 of the piston rod and with a counter-bore 32 telescopically fitting face 19 of head 6. The sealing ring 11 is compressed in the bottom of said counter-bore by the end of the head. It will be seen that nut 12 clamps the elements of the piston as above set forth to hold the packing rings firmly clamped.

It will be evident that reciprocating movement of the piston, during a pumping operation, will result in a pressure causing a tighter sealing engagement of the packing rings and the cylinder wall; that said pressure is sealed from passing to the metallic joint between the spacer ring and the head and follower by the undercut or dovetail seals at 26; and that the ring 11 also seals against pressure leaking by the threads of rod end 16 to said joint.

In practice, the packing rings 8 and 11 are integrally connected by portions 33 that extend through transverse holes 34 formed in spacer plate 7. When said packing rings are molded, said spacer plate is so located in the mold that the same becomes embedded, the rubber flowing through and filling holes 34 and filling the mold on both sides of said spacer plate.

The means 13 comprises a ring or flange 35 welded at 36 to each side of the spacer ring. The diameter of the rings 35 is somewhat less than that of said spacer ring and their width is approximately one-half the width of the packing rings. The rubber of the latter will mold around rings 35 substantially as shown. It will be seen that only that annular portion of each packing ring between the outer edge of ring 35 and annular edge 28 is free to flow under pumping pressures and that the remaining portions of the packing rings, while yet elastic, are held from free flow by the reinforcing rings. Thus, the annular portion 37 of each packing ring, outside of the reinforcing rings, is not subjected to pumping pressure and cannot flow to become pinched between the wall of cylinder 23 and the spacer plate. Undue wear at this point is thereby minimized and increased efficient life given to the piston.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A piston structure comprising a pair of oppositely disposed packing rings each formed with an inner annular flange defined by a flat edge at one end and an angular dove-tail edge at the other, said latter edges being opposed, a spacer plate substantially flush with the outer surface of the packing rings and disposed between the packing rings and being apertured, an integral portion connecting the packing rings through said aperture, and telescopic members clamping said spacer plate and having opposed dove-tail seats for the dove-tail edges of the packing rings.

2. A piston structure comprising a pair of oppositely disposed packing rings each formed with an inner annular flange defined by a flat edge at one end and an angular dove-tail edge at the other, said latter edges being opposed, a spacer plate substantially flush with the outer surface of the packing rings and disposed between the packing rings and being apertured, an integral portion connecting the packing rings through said aperture, a ring extension on each side of the spacer plate and embedded in the packing rings inward of the outer surface of the packing rings, to reinforce the latter and to obviate flow of the material thereof under operative pressure, and telescopic members clamping said spacer plate and having opposed dove-tail seats for the dove-tail edges of the packing rings.

WELTON G. WELLINGTON.

REFERENCES CITED

The following references are of record in the file of this patent:

UNITED STATES PATENTS

| Number | Name | Date |
|---|---|---|
| 1,577,732 | Lamb | Mar. 23, 1926 |
| 1,732,189 | Boeck et al. | Oct. 15, 1929 |
| 1,844,236 | Armentrout | Feb. 9, 1932 |
| 1,849,096 | Kibele | Mar. 15, 1932 |
| 2,051,262 | MacClatchie | Aug. 18, 1936 |
| 2,063,724 | Cater | Dec. 8, 1936 |
| 2,163,162 | Wells | June 20, 1939 |
| 2,267,882 | Wilson | Dec. 30, 1941 |
| 2,277,501 | Murray | Mar. 24, 1942 |
| 2,287,483 | Miller | June 23, 1942 |
| 2,295,678 | Miller | Sept. 15, 1942 |
| 2,487,390 | Smith | Nov. 8, 1949 |